(12) United States Patent
Holloway et al.

(10) Patent No.: US 7,830,823 B2
(45) Date of Patent: Nov. 9, 2010

(54) SIP TELEPHONE FEATURE CONTROL

(75) Inventors: Kenneth E. Holloway, Boca Raton, FL (US); David A. VanderMeiden, Boca Raton, FL (US); Dennis L. Kucmerowski, Delray Beach, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1084 days.

(21) Appl. No.: 11/147,018

(22) Filed: Jun. 7, 2005

(65) Prior Publication Data

US 2006/0274678 A1 Dec. 7, 2006

(51) Int. Cl.
*H04L 12/16* (2006.01)
*H04J 3/16* (2006.01)
*H04M 3/42* (2006.01)
*H04M 7/00* (2006.01)

(52) U.S. Cl. .................. 370/260; 370/466; 379/211.01; 379/225

(58) Field of Classification Search ........... 370/52–356, 370/389, 392, 395.21; 379/211.02
See application file for complete search history.

(56) References Cited

U.S. PATENT DOCUMENTS

| | | | |
|---|---|---|---|
| 6,937,597 B1 * | 8/2005 | Rosenberg et al. ........... 370/356 |
| 2002/0143972 A1 * | 10/2002 | Christopoulos et al. ..... 709/231 |
| 2003/0235182 A1 * | 12/2003 | McMullin .................... 370/352 |
| 2004/0047339 A1 * | 3/2004 | Wang et al. .................. 370/352 |
| 2004/0165713 A1 * | 8/2004 | Leighton ..................... 379/225 |
| 2004/0249955 A1 * | 12/2004 | Wuerful ...................... 709/227 |
| 2005/0074111 A1 * | 4/2005 | Hanson et al. ......... 379/212.01 |
| 2005/0123117 A1 * | 6/2005 | Stockdale .............. 379/207.02 |
| 2005/0125083 A1 * | 6/2005 | Kiko ............................ 700/19 |
| 2005/0132412 A1 * | 6/2005 | Richardson et al. ......... 725/100 |
| 2005/0195957 A1 * | 9/2005 | Gibson .................. 379/211.02 |
| 2006/0080429 A1 * | 4/2006 | Motoyama et al. .......... 709/224 |
| 2006/0239247 A1 * | 10/2006 | Postmus ..................... 370/352 |
| 2006/0256816 A1 * | 11/2006 | Yarlagadda et al. ......... 370/466 |

OTHER PUBLICATIONS

"Using CST for SIP Phone User Agents (uaCSTA); ETSI TR 102 348," ETSI Standards, European Telecommunications Standards Institute, Sophia-Antipo, FR, vol. ECMATC32, No. V111, Sep. 2004, pp. 1-75 XP014015637.

(Continued)

*Primary Examiner*—Huy D Vu
*Assistant Examiner*—Brandon Renner

(57) ABSTRACT

A Session Initiation Protocol (SIP) enabled device sends feature information about remotely configurable features that are offered by the SIP enabled device to a central server. The central server uses the feature information to determine if the features that are offered by the SIP enabled device are compatible with features that are offered by the central server. The central server remotely configures the features that are offered by the SIP enabled device to ensure interoperability with the features that are offered by the central server. The SIP enabled device notifies the central server if a feature button associated with a feature, which has been disabled by the central server, has been pressed by a user of the SIP enabled device. The central server seamlessly provides a comparable feature to the user, including the setting of a Light Emitting Diode, which is associated with the feature button, to an appropriate state.

21 Claims, 4 Drawing Sheets

OTHER PUBLICATIONS

Petrie Pingtel Corp D: "A Framework for Session Initiation Protocol User Agent Profile Delivery; draft-ietf-sipping-config-framework-06.txt;" IETF Standar-Working-Draft, Internet Engineering Task Force, IETF, CH vol. Sipping, No. 6, Feb. 19, 2005, pp. 1-38 XP015027880.

MacFaden M. et al: "Configuring networks and devices with Simple Network Management Protocol (SNMP), RFC 3512," IETF Request for Comment, [Online], Apr. 2003, pp. 1-69, XP002397698 URL: <http://www.ietf.org/rfc/rfc3512.txt?number=3512>.

Anonymous: "optiPoint 100 advance IP Telephone", Siemens Data Sheet, [Online], Feb. 2001, pp. 1-2, XP 002397699, URL: <http://www.siemens.ie/enterprise/workpoint_clients/optipoint100adv.htm>.

* cited by examiner

SIP TELEPHONE FEATURE CONTROL

FIELD OF THE INVENTION

The present invention relates to communications networks comprised of devices that are enabled to employ the Session Initiation Protocol, and, more particularly, to centralized management and control of features offered by SIP enabled devices.

BACKGROUND OF THE INVENTION

The Session Initiation Protocol ("SIP") is an application-layer control protocol for creating, modifying, and terminating sessions between SIP enabled devices. The SIP protocol is described in the Internet Engineering Task Force (IETF) Request for Comments (RFC) 3261, dated June 2002; the disclosure of which is incorporated herein by reference in its entirety. Accordingly, it is known in the art that SIP may be used by SIP based applications to manage communications sessions for Internet telephony and distributed multimedia conferencing.

Devices that are enabled to employ SIP may provide a number of features as part of an integrated feature set. A feature may be a standard feature, which is implemented in a standardized way by SIP enabled device manufacturers. Alternatively, a feature may be a supplemental feature, which is implemented in a proprietary way that is unique to a particular device manufacturer.

A SIP enabled device may be used in conjunction with a central server, such as for example, a Central Office ("CO") switch, a Private Branch Exchange ("PBX") switch, or an Internet Protocol ("IP") based communications server. SIP features that are offered by the SIP enabled device can be standalone features or alternatively features that are used in combination with features provided by the central server. However, problems may occur if the central server offers the same feature as the SIP enabled device. Further, the central server may offer additional features that interact with the features offered by the SIP enabled device in undesirable ways.

Currently, features that are offered by the SIP enabled device can only be enabled or disabled locally by a user or remotely by a system administrator of the SIP enabled device using proprietary application software. That is, there is no way for the central server to control whether the features that are offered by the SIP enabled device are enabled or disabled. Thus, the central server must use or interact with all features that have been enabled by the user or the systems administrator. Consequently, where conflicts are encountered, some or all of the features may not function properly, which results in user dissatisfaction.

SUMMARY OF THE INVENTION

The foregoing and other problems and deficiencies in the prior art are overcome by the present invention, which provides an apparatus, computer program, and method for disabling and enabling SIP based features from a central communications server.

An object of the present invention is to define a standard format for constructing messages that are used by a SIP enabled device to report information about SIP based features to a central server.

Another object of the present invention is to define a standard format for constructing initialization messages that are used by a central server to initialize features of a local SIP enabled device.

Yet another object of the present invention is to allow a central server to enable or disable proprietary features of a local SIP enabled device.

A further object of the present invention is to use feature indicator values to identify which features are to be enabled or disabled in a local SIP enabled device.

Yet another object of the present invention is to provide a standard message set to be used by a SIP enabled device to report to a central server that a button associated with a disabled feature has been depressed by a user.

Still another object of the present invention is to allow a central server to perform a function equivalent to a feature that has been disabled on a local SIP enabled device, when a button associated with the disabled feature is depressed by a user.

BRIEF DESCRIPTION OF THE DRAWINGS

The foregoing objects are achieved and other features and advantages of the present invention will become more apparent in light of the following detailed description of exemplary embodiments thereof, as illustrated in the accompanying drawings, where.

DETAILED DESCRIPTION

Figure 1:
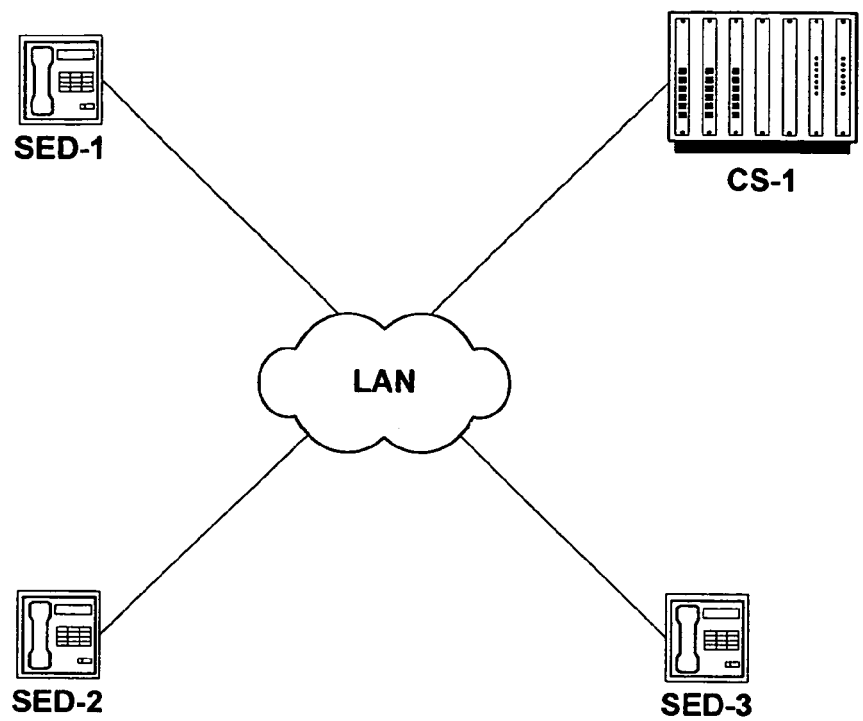
FIG. 1 depicts an exemplary network that employs SIP Enabled Devices of the present invention.

Referring to FIG. 1, an exemplary network employing SIP Enabled Devices of the present invention is depicted. A Local Area Network LAN interconnects a first SIP Enabled Device SED-1, a second SIP Enabled Device SED-2, a third SIP Enabled Device SED-3, and a Central Server CS-1. As will be understood, the Central Server CS-1 facilitates communications among the SIP Enabled Devices SED-1, SED-2, and SED-3.

Figure 2:
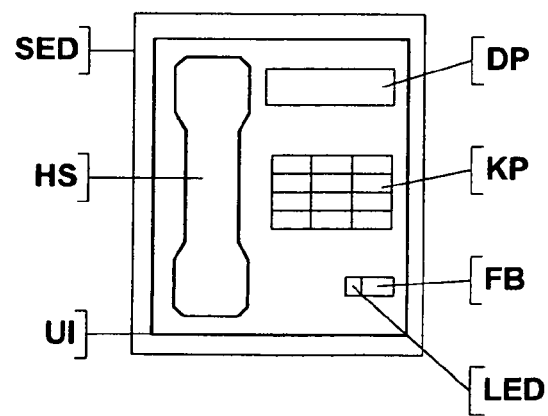
FIG. 2 depicts an exemplary user interface of a SIP Enabled Device of the present invention.

Referring now to FIG. 2, an exemplary User Interface UI of a SIP Enabled Device SED is depicted. The User Interface UI is comprised of a Handset HS, a Display DP, a Keypad KP, a Feature Button FB, and a Light Emitting Diode LED, which is associated with the Feature Button FB. For illustrative explanation it is assumed that the SIP Enabled Device SED has a proprietary call forward feature implemented within. When a user (not shown) depresses the Feature Button FB during a call, the user is prompted to use the Keypad KP to identify another SIP Enabled Device (not shown) to which the call should be forwarded. Unless otherwise indicated, for purposes of illustration, all SIP enabled devices discussed in the examples that follow will be assumed to have the User Interface UI depicted in FIG. 2.

Exemplary message exchanges are depicted in FIGS. 3-6. A message is depicted as a horizontal line segment with an arrow at an end of the line segment, which indicates a direction of information flow. A plurality of messages that are part of a message exchange are depicted as a horizontal line segment with an arrow at each end of the line segment, which indicate that information flows in both directions. A textual description is provided along a line segment to describe the message represented by the line segment. Each textual description contains a number in parenthesis that indicates a relative ordering of the associated message.

Figure 3:
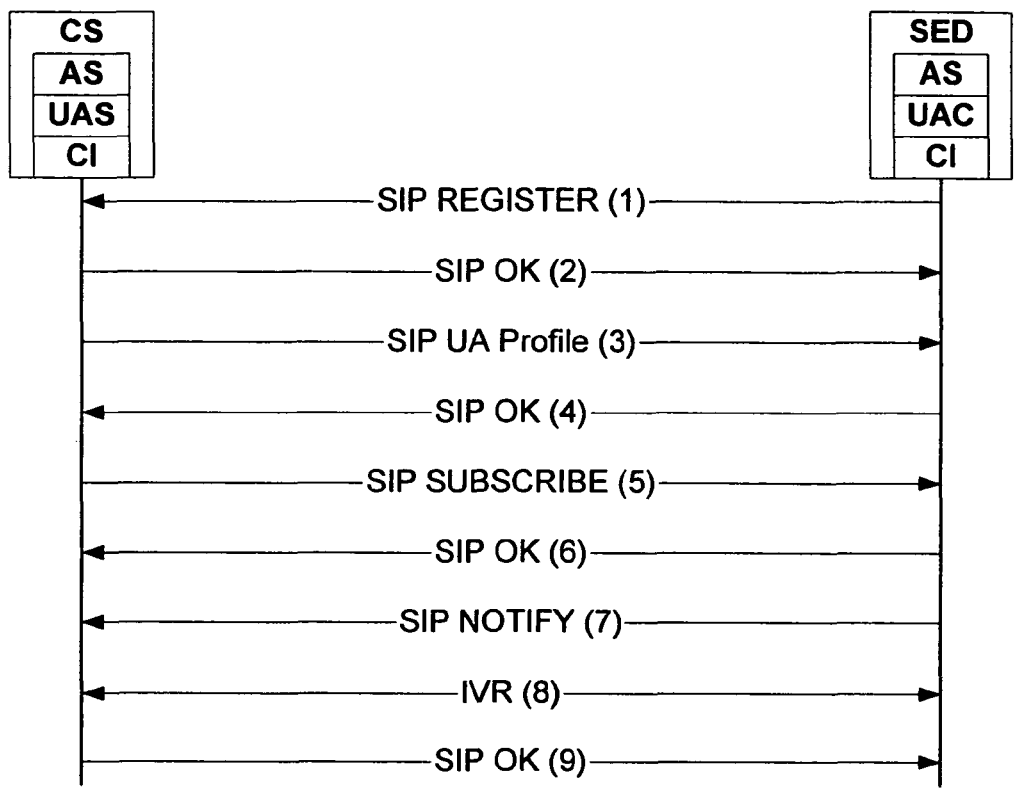
FIG. 3 depicts an exemplary message exchange that is used to control features of a SIP Enabled Device according to a first embodiment of the present invention.

Referring now to FIG. 3, an exemplary message exchange between a SIP Enabled Device SED and Central Server CS according to a first embodiment of the present invention is depicted. The first embodiment employs standard SIP messaging, Interactive Voice Response messaging, and messaging defined in the IETF Internet Draft called "A Framework for Session Initiation Protocol User Agent Profile Delivery," which will be described in more detail below. The SIP Enabled Device SED is comprised of a SIP User Agent Client UAC that communicates with Application Software AS executing on a microprocessor (not shown) of the SIP Enabled Device SED. The SIP User Agent Client UAC of the SIP Enabled Device SED sends SIP request messages and receives SIP response messages through Communications Interface CI.

The Central Server CS is comprised of a SIP User Agent Server UAS that communicates with Application Software AS executing on a microprocessor (not shown) of the Central Server CS. The Application Software AS of the Central Server CS facilitates SIP based communications and provides advanced feature functionality for the SIP Enabled Device SED. The SIP User Agent Server UAS of the Central Server CS receives SIP request messages and sends SIP response messages using a Communications Interface CI.

When the SIP Enabled Device SED is initialized, a SIP REGISTER (1) message is sent from the SIP User Agent Client UAC of the SIP Enabled Device SED to the SIP User Agent Server UAS of the Central Server CS. The SIP REGISTER (1) message contains typical SIP registration information in various header fields of the message as is known. In addition, the SIP REGISTER (1) message contains feature information in a body of the message. This feature information includes one or more feature mappings and corresponding button mappings.

For example, assume that the SIP Enabled Device SED has a User Interface UI as shown in FIG. 2 and only implements one remotely configurable feature, which is identified as "Call Forward." The SIP User Agent Client UAC of the SIP Enabled Device SED generates the SIP REGISTER (1) message with a body that contains a feature mapping, such as a name-value pair of "01=Call Forward" that maps the feature named "Call Forward" to a feature indicator value of "01." The body of the SIP REGISTER (1) message further contains a button mapping, such as "01=button #1" which maps a button named "button #1" to the feature indicator value "01."

The SIP User Agent Server UAS of the Central Server CS confirms receipt of the SIP REGISTER (1) message by sending a SIP OK (2) message. Assume that the Application Software AS of the Central Server CS implements a call forward feature that is incompatible with the "Call Forward" feature implemented within the SIP Enabled Device SED. That is, using the "Call Forward" feature of the SIP Enabled Device SED with the call forward feature of the Central Server CS produces undesirable results.

The SIP User Agent Server UAS of the Central Server CS processes the feature information in the body of the SIP REGISTER (1) message and provides it to the Application Software AS of the Central Server CS. The Application Software AS of the Central Server CS determines that the "Call Forward" feature reported by the SIP User Agent Client UAC of the SIP Enabled Device SED in the SIP REGISTER (1) message is incompatible with its own implementation of the call forward feature. Thus, the Application Software AS of the Central Server CS causes the SIP User Agent Server UAS of the Central Server CS to generate a message that instructs the SIP Enabled Device SED to disable the internal "Call Forward" feature.

The Application Software AS of the Central Server CS disables the "Call Forward" feature in the SIP Enabled Device SED by instructing the SIP User Agent Server UAS of the Central Server CS to send a SIP UA Profile (3) message to the SIP User Agent Client UAC of the SIP Enabled Device SED. The SIP UA Profile (3) message causes a change to a value of a parameter that the Application Software AS of the SIP Enabled Device SED uses to determine whether or not to enable the "Call Forward" feature. When the Application Software AS of the SIP Enabled Device SED finishes disabling the "Call Forward" feature, the SIP User Agent Client UAC of the SIP Enabled Device SED sends a SIP OK (4) message to the SIP User Agent Server UAS of the Central Server CS.

An IETF Internet-Draft named "A Framework for Session Initiation Protocol User Agent Profile Delivery" dated Feb. 19, 2005 has been proposed by Petrie that describes an extension to the SIP (hereinafter "Petrie"). Petrie defines a means for automatically providing profile data to a SIP user agent, when the SIP user agent is first connected to a network. Petrie also defines a means for a central server to provide updates to parameter values contained in the SIP user agent's profile using SIP messages, which are hereinafter referred to as SIP UA Profile messages. The foregoing Internet Draft which is herein incorporated by reference in its entirety, may be obtained from the IETF web site by downloading a file named "draft-ietf-sipping-config-framework-06.txt."

Next, the Application Software AS of the Central Server CS causes the SIP User Agent Server UAS of the Central Server CS to send a message to the SIP User Agent Client UAC, which instructs the Application Software AS of the SIP Enabled Device SED to report button-press events associated with the resource named "button #1" which in this example corresponds to the Feature Button FB. To accomplish this, the SIP User Agent Server UAS of the Central Server CS generates and sends a SIP SUBSCRIBE (5) message to the SIP User Agent Client UAC of the SIP Enabled Device SED. SIP SUBSCRIBE and NOTIFY messages are defined in IETF RFC 3265, which is herein incorporated by reference in its entirety. The SIP SUBSCRIBE (5) message includes an Event header, which includes the feature indicator value and the resource identifier to which button-press events are being subscribed. For example, the Event header may include "01=button #1" or "01=Call Forward." The SIP User Agent Client UAC of the SIP Enabled Device SED acknowledges receipt of the SIP SUBSCRIBE (5) message by sending a SIP OK (6) message to the SIP User Agent Server UAS of the Central Server CS.

By way of example, in an illustrative implementation, assume that multiple instances of the SIP Enabled Device SED according to the first embodiment of the present invention are used for each of SIP Enabled Device SED-1, SIP Enabled Device SED-2, and SIP Enabled Device SED-3 of FIG. 1. Further assume that an instance of the Central Server CS according to the first embodiment of the present invention is used for the Central Server CS-1 of FIG. 1. The SIP Enabled Device SED-1 calls SIP Enabled Device SED-2 and a user (not shown) of the SIP Enabled Device SED-2, presses the Call Forward Feature Button FB and uses the Keypad KP to identify the SIP Enabled Device SED-3 as a call forward destination. This results in the call from SIP Enabled Device SED-1 to SIP Enabled Device SED-2 being transformed into a call from SIP Enabled Device SED-1 to SIP Enabled Device SED-3.

Referring once again to FIGS. 2 and 3, when the user (not shown) of the SIP Enabled Device SED-2 presses the Function Button FB of the User Interface UI, the Application Software AS of the SIP Enabled Device SED-2 instructs the SIP User Agent Client UAC of the SIP Enabled Device SED-2 to generate a SIP NOTIFY (7) message, which is sent to the SIP User Agent Server UAS of the Central Server CS. An Event header of the SIP NOTIFY (7) message contains a feature indicator value that corresponds to the Function Button FB, using the same format that was used in the Event header of the SIP SUBSCRIBE (5) message.

When the Application Software AS of the Central Server CS is notified by the SIP User Agent Server UAS of the Central Server CS that the button-press event has occurred, the Application Software AS of the Central Server CS invokes a software routine that implements its own call forward feature functionality and a software routine for an Interactive Voice Response ("IVR") software routine, which works in conjunction with the Call Forward feature. The IVR software routine generates an in-band audible prompt that requests the user (not shown) to enter a call forward destination.

The user (not shown) of the SIP Enabled Device SED-2 uses the Keypad KP to enter the call forward destination, which in this example is the SIP Enabled Device SED-3, and corresponding Dual Tone Multi-Frequency ("DTMF") signals are encoded and sent as data to the Central Server CS. The data traffic that results from the IVR software routine and the use of the Keypad KP is depicted as IVR (8) in FIG. 3. The IVR software routine decodes the DTMF data and passes the call forward destination to the Application Software AS of the Central Server CS, which then causes the incoming call to the SIP Enabled Device SED-2 to be forwarded to the SIP Enabled Device SED-3.

The Application Software AS of the Central Server CS instructs the SIP User Agent Server UAS of the Central Server CS to create a SIP OK (9) message that is sent to the SIP User Agent Client UAC of the SIP Enabled Device SED. The SIP OK (9) message contains a resource state value corresponding to a state of the Light Emitting Diode LED that is associated with the Function Button FB. For example, the SIP OK (9) message contains one of the following: "0=Off," "1=On," "2=Flash," "3=Wink," or "4=Flutter." The SIP User Agent Client UAC of the SIP Enabled Device SED receives the SIP OK (9) message and passes the resource state value to the Application Software AS of the SIP Enabled Device SED, which causes the Light Emitting Diode LED of the Function Button FB to flash, for example.

Figure 4:
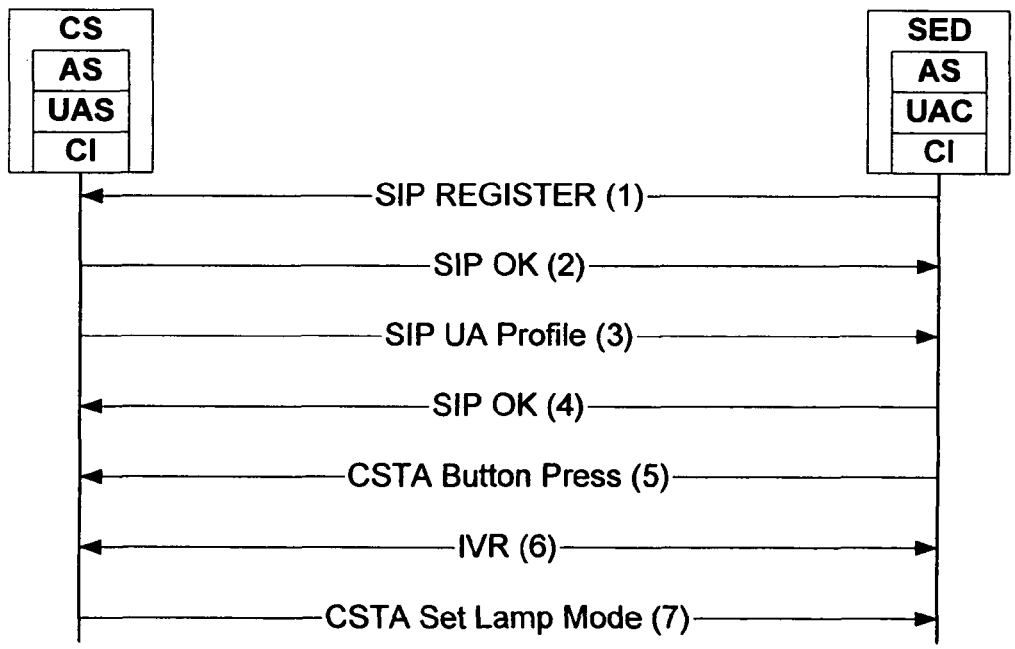
FIG. 4 depicts an exemplary message exchange that is used to control features of a SIP Enabled Device according to a second embodiment of the present invention.

Referring now to FIG. 4, an exemplary message exchange between a SIP Enabled Device SED and Central Server CS according to a second embodiment of the present invention is depicted. The second embodiment employs standard SIP messaging, UA Profile messaging, IVR messaging, and Computer Supported Telecommunications Applications messaging, which will be described in more detail below. The SIP Enabled Device SED is comprised of a SIP User Agent Client UAC that communicates with Application Software-AS executing on a microprocessor (not shown) of the SIP Enabled Device SED. The SIP User Agent Client UAC of the SIP Enabled Device SED sends SIP request messages and receives SIP response messages through Communications Interface CI.

The Central Server CS is comprised of a SIP User Agent Server UAS that communicates with Application Software AS executing on a microprocessor (not shown) of the Central Server CS. The Application Software AS of the Central Server CS facilitates SIP based communications and provides advanced feature functionality for the SIP Enabled Device SED. The SIP User Agent Server UAS of the Central Server CS receives SIP request messages and sends SIP response messages using Communications Interface CI.

When the SIP Enabled Device SED is initialized, a SIP REGISTER (1) message is sent from the SIP User Agent Client UAC of the SIP Enabled Device SED to the SIP User Agent Server UAS of the Central Server CS. The SIP REGISTER (1) message contains typical SIP registration information in various header fields of the message. In addition, the SIP REGISTER (1) message contains feature information in a body of the message. This feature information includes one or more feature mappings and corresponding button mappings.

For example, assume that the SIP Enabled Device SED has a User Interface UI as shown in FIG. 2 and only implements one remotely configurable feature, which is identified as "Call Forward." The SIP User Agent Client UAC of the SIP Enabled Device SED generates the SIP REGISTER (1) message with a body that contains a feature mapping, such as a name-value pair of "01=Call Forward" that maps the feature named "Call Forward" to a feature indicator value of "01." The body of the SIP REGISTER (1) message further contains a button mapping, such as "01=button #1" which maps a button named "button #1" to the feature indicator value "01."

The SIP User Agent Server UAS of the Central Server CS confirms receipt of the SIP REGISTER (1) message by sending a SIP OK (2) message. Assume that the Application Software AS of the Central Server CS implements a call forward feature that is incompatible with the "Call Forward" feature implemented within the SIP Enabled Device SED. That is, using the "Call Forward" feature of the SIP Enabled Device SED with the call forward feature of the Central Server CS produces undesirable results.

The SIP User Agent Server UAS of the Central Server CS processes the feature information in the SIP REGISTER (1) message and provides it to the Application Software AS of the Central Server CS. The Application Software AS of the Central Server CS determines that the "Call Forward" feature reported by the SIP User Agent Client UAC of the SIP Enabled Device SED in the SIP REGISTER (1) message is incompatible with its own implementation of the call forward feature. Thus, the Application Software AS of the Central Server CS instructs the SIP User Agent Server UAS of the Central Server CS to generate a message that instructs the SIP Enabled Device SED to disable the internal "Call Forward" feature.

The Application Software AS of the Central Server CS disables the "Call Forward" feature in the SIP Enabled Device SED by instructing the SIP User Agent Server UAS of the Central Server CS to send a SIP UA Profile (3) message to the SIP User Agent Client UAC. The SIP UA Profile (3) message causes a change to a value of a parameter that the Application Software AS of the SIP Enabled Device SED uses to determine whether or not to enable the "Call Forward" feature. When the Application Software AS of the SIP Enabled Device SED finishes disabling the "Call Forward" feature, the SIP User Agent Client UAC of the SIP Enabled Device SED sends a SIP OK (4) message to the SIP User Agent Server UAS of the Central Server CS.

A user (not shown) of the SIP Enabled Device SED receives an incoming call that she wishes to forward to another SIP enabled device (not shown). When the user (not shown) of the SIP Enabled Device SED presses the Function Button FB of the User Interface UI, the Application Software AS of the SIP Enabled Device SED invokes a CSTA software routine (not shown) that causes a CSTA Button Press (5) message to be sent to the Central Server CS.

The European Computer Manufacturers Association ("ECMA") has defined a protocol that facilitates the development of Computer Supported Telecommunications Applications ("CSTA"). The CSTA protocol is defined in ECMA-269, which is herein incorporated by reference in its entirety. Section 21.2.2 of ECMA-269 defines a Button Press event. Table 21-60 of ECMA-269 defines parameters associated with a Button Press event. For example, the SIP Enabled Device SED sends a CSTA Button Press message when the Feature Button FB is depressed.

Section 21.1.17 of ECMA-269 defines a Set Lamp Mode service that allows a computing function to control a specified lamp of a specified device. Table 21-37 of ECMA-269 defines a lampMode parameter of a Set Lamp Mode service request. The Central Server CS sends a Set Lamp Mode service request message to the SIP Enabled Device SED to change the state of the Light Emitting Diode LED that is associated Feature Button FB. For example, a Set Lamp Mode service request message with a lampMode value of 1 causes the Light Emitting Diode LED to flutter; a lampMode value of 2 causes the Light Emitting Diode LED to turn off, a lampMode value of 3 causes the Light Emitting Diode LED to be continuously lit, and a lampMode value of 4 causes the Light Emitting Diode LED to wink.

The Application Software AS of the Central Server CS includes a CSTA software routine (not shown) that processes the CSTA Button Press (5) message. When the Application Software AS determines that the Feature Button FB has been depressed, an IVR software routine that works in conjunction with the call forward feature is invoked. The IVR software routine generates an in-band audible prompt that requests the user (not shown) to enter a call forward destination.

The user (not shown) of the SIP Enabled Device SED uses the Keypad KP to enter a call forward destination and corresponding DTMF signals are encoded and sent as data to the Central Server CS. The data traffic that results from the IVR software routine and the use of the Keypad KP is depicted as IVR (6) in FIG. 4. The IVR software routine decodes the DTMF data and passes the call forward destination to the Application Software AS of the Central Server CS, which then causes the incoming call to the SIP Enabled Device SED to be forwarded to the call forward destination. The Application Software AS of the Central Server CS instructs the CSTA software routine (not shown) to create a CSTA Set Lamp Mode (7) service request message to the SIP Enabled Device SED. The CSTA software routine (not shown) of the SIP Enabled Device SED processes the CSTA Set Lamp Mode (7) service request message, which results in the Application Software AS of the SIP Enabled Device SED causing the Light Emitting Diode LED of the Function Button FB to flutter, for example.

Figure 5:
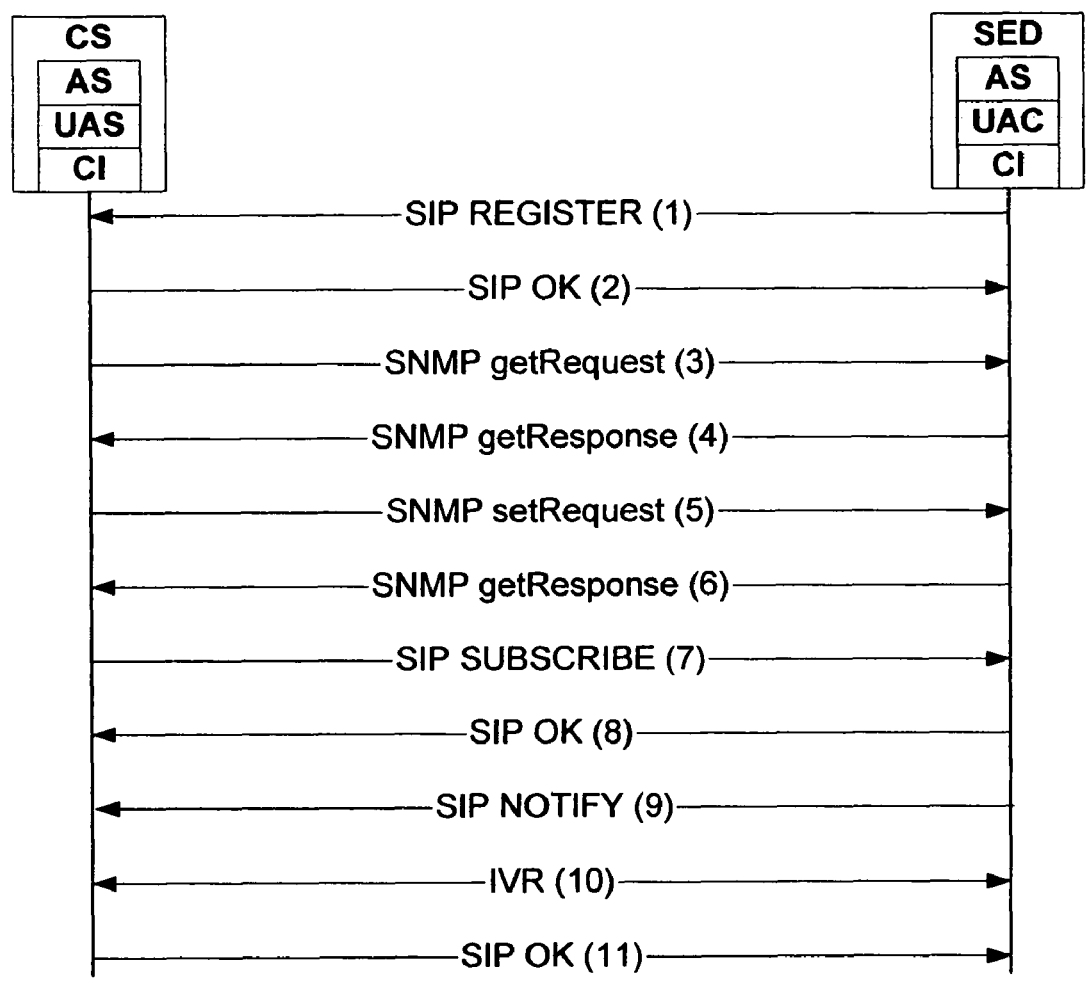
FIG. 5 depicts an exemplary message exchange that is used to control features of a SIP Enabled Device according to a third embodiment of the present invention.

Referring now to FIG. 5, an exemplary message exchange between a SIP Enabled Device SED and Central Server CS according to a third embodiment of the present invention is depicted. The third embodiment employs standard SIP messaging, IVR messaging, and Simple Network Management Protocol messaging, which will be described in more detail below. The SIP Enabled Device SED is comprised of a SIP User Agent Client UAC that communicates with Application Software AS executing on a microprocessor (not shown) of the SIP Enabled Device SED. The SIP User Agent Client UAC of the SIP Enabled Device SED sends SIP request messages and receives SIP response messages through Communications Interface CI.

The Central Server CS is comprised of a SIP User Agent Server UAS of the Central Server CS that communicates with Application Software AS executing on a microprocessor (not shown) of the Central Server CS. The Application Software AS of the Central Server CS facilitates SIP based communications and provides advanced feature functionality for the SIP Enabled Device SED. The SIP User Agent Server UAS of the Central Server CS receives SIP request messages and sends SIP response messages using Communications Interface CI.

The Simple Network Management Protocol ("SNMP") was developed by the IETF and is defined in RFC 1157, which is herein incorporated by reference in its entirety. The SNMP defines standards for network management, which include a protocol, a database structure specification, and a set of data objects. The SNMP architecture defines a client-server relationship. An SNMP client, which is also referred to as an SNMP manager, manages network elements. Each network element contain an SNMP server, which is also referred to as an SNMP agent, that responds to SNMP request messages sent by the SNMP client. The SNMP also defines a structure for a database called a Management Information Base ("MIB"). Data objects within a MIB are referred to by a unique Object Identifier ("OID").

The SNMP defines several message types, such as an SNMP getRequest message, an SNMP getResponse message, and an SNMP setRequest message. An SNMP manager sends an SNMP getRequest message to an SNMP agent to determine a value of a particular object that is defined in a MIB, to which the SNMP agent has access. The SNMP getRequest message contains an OID for a particular object of interest to the SNMP manager. The SNMP agent responds to the SNMP getrequest message with an SNMP getResponse message that contains the current value of the object associated with the OID. The SNMP manager sends an SNMP setRequest message to an SNMP agent to change a value of an object that is defined in the MIB. The SNMP setRequest message contains an OID for a particular object and a data value. The SNMP agent updates a stored value for an object defined in the MIB that corresponds to the OID in the setRequest message, if the SNMP manager is authorized to make such requests. The SNMP agent responds to the SNMP manager with an SNMP getResponse message.

For example, a MIB stored in a memory device (not shown) of the SIP Enabled Device SED defines an object called featureStateCallForward, which may be assigned an integer value. Assume that a current value associated with the featureStateCallForward object is "1." The SNMP manager can change the value of the featureStateCallForward object to "0" by sending an SNMP setRequest message, which contains an OID that corresponds to the featureStateCallForward object and data value of "0." Upon receipt of the SNMP setRequest message, the SNMP Agent attempts to update the value of the object associated with the OID. The SNMP agent responds to the SNMP manager with an SNMP getResponse message. The SNMP getResponse message returns the current value of the object associated with the OID or an error code, if there was a problem finding or setting the object associated with the OID in the SNMP setRequest message or if the SNMP manager is not authorized to make such a request.

When the SIP Enabled Device SED is initialized, a SIP REGISTER (1) message is sent from the SIP User Agent Client UAC of the SIP Enabled Device SED to the SIP User Agent Server UAS of the Central Server CS. The SIP REG- ISTER (1) message contains typical SIP registration information in various header fields of the message.

The SIP User Agent Server UAS of the Central Server CS confirms receipt of the SIP REGISTER (1) message by sending a SIP OK (2) message. The Application Software AS of the SIP Enabled Device SED includes software routines that implement an SNMP manager (not shown). In this embodiment, Application Software AS of the Central Server CS implements a call forward feature. The Application Software AS of the Central Server CS processes the MIB and locates the featureStateCallForward object and determine whether this feature is currently enabled on the SIP Enabled Device SED. To accomplish this, the SNMP manager (not shown) of the Central Server CS generates and sends an SNMP getRequest (3) message, which contains the OID associated with the featureStateCallForward object, to the SNMP agent (not shown) of the SIP Enabled Device SED.

The SNMP agent (not shown) of the SIP Enabled Device SED responds by determining a current value for the featureStateCallForward object, which in this case is "1." The SNMP agent (not shown) of the SIP Enabled Device SED puts the current value in an SNMP getResponse (4) message and sends it to the SNMP manager (not shown) of the Central Server CS. The SNMP manager (not shown) of the Central Server CS processes the SNMP getResponse (4) message and passes the current value of the featureStateCallForward object to the Application Software AS of the Central Server CS. The Application Software AS of the Central Server CS determines that the Call Forward feature that is offered by the SIP Enabled Device SED is enabled, because the value of the featureStateCallForward object is "1."

The Application Software AS of the Central Server CS also determines that the feature associated with the featureStateCallForward object is incompatible with a call forward feature that is implemented by the Application Software AS of the Central Server CS. The SNMP manager (not shown) of the Central Server CS constructs an SNMP setRequest (5) message, which includes the OID for the featureStateCallForward object and a data value of "0." The SNMP setRequest (5) message is sent to the SNMP agent (not shown) of the SIP Enabled Device SED. The SNMP agent (not shown) of the SIP Enabled Device SED updates the value the featureStateCallForward object and returns a SNMP getResponse (6) message to the SNMP manager (not shown) of the Central Server CS. The Application Software AS of the SIP Enabled Device SED monitors the value of the featureStateCallForward object. When the value of the featureStateCallForward object is changed to "0" the Application Software AS of the SIP Enabled Device SED disables the Call Forward feature.

The Application Software AS of the Central Server CS is informed when a user (not shown) of the SIP Enabled Device SED attempts to activate the disabled Call Forward Feature by pressing the Feature Button FB. To accomplish this, the Application Software AS of the Central Server CS causes the SIP User Agent Server UAS of the Central Server CS to generate a SIP SUBSCRIBE (7) message, which includes an Event header that contains the value of the featureButtonCallForward object. The SIP User Agent Client UAC of the SIP Enabled Device SED acknowledges receipt of the SIP SUBSCRIBE (7) message by sending a SIP OK (8) message to the SIP User Agent Server UAS of the Central Server CS.

A user (not shown) of the SIP Enabled Device SED receives an incoming call that she wishes to forward to another SIP enabled device (not shown). When the user (not shown) of the SIP Enabled Device SED presses the Function Button FB of the User Interface UI, the Application Software AS of the SIP Enabled Device SED instructs the SIP User Agent Client UAC of the SIP Enabled Device SED to generate a SIP NOTIFY (9) message, which is sent to the SIP User Agent Server UAS of the Central Server CS. An Event header of the SIP NOTIFY (9) message contains a feature identifier value which corresponds to the value of the featureButtonCallForward object that was returned in the SNMP getResponse (6) message.

When the Application Software AS of the Central Server CS is notified by the SIP User Agent Server UAS of the Central Server CS that the button-press event has occurred, the Application Software AS of the Central Server CS invokes a software routine that implements its own call forward feature functionality and an IVR software routine, which works in conjunction with the Call Forward feature. The IVR software routine generates an in-band audible prompt that requests the user (not shown) to enter a call forward destination.

The user (not shown) of the SIP Enabled Device SED uses the Keypad KP to enter the call forward destination and corresponding DTMF signals are encoded and sent as data to the Central Server CS. The data traffic that results from the IVR software routine and the use of the Keypad KP is depicted as IVR (10) in FIG. 5. The IVR software routine decodes the DTMF data and passes the call forward destination to the Application Software AS of the Central Server CS, which then causes the call to the SIP Enabled Device SED to be forwarded to the call forward destination.

The Application Software AS of the Central Server CS instructs the SIP User Agent Server to create a SIP OK (11) message that is sent to the SIP User Agent Client UAC. The SIP OK (11) message contains a resource state value corresponding to a state of the Light Emitting Diode LED that is associated with the Function Button FB. The SIP User Agent Client UAC of the SIP Enabled Device SED receives the SIP OK (11) message and passes the resource state value to the Application Software AS of the SIP Enabled Device SED, which causes the Light Emitting Diode LED of the Function Button to flash, for example.

Figure 6:
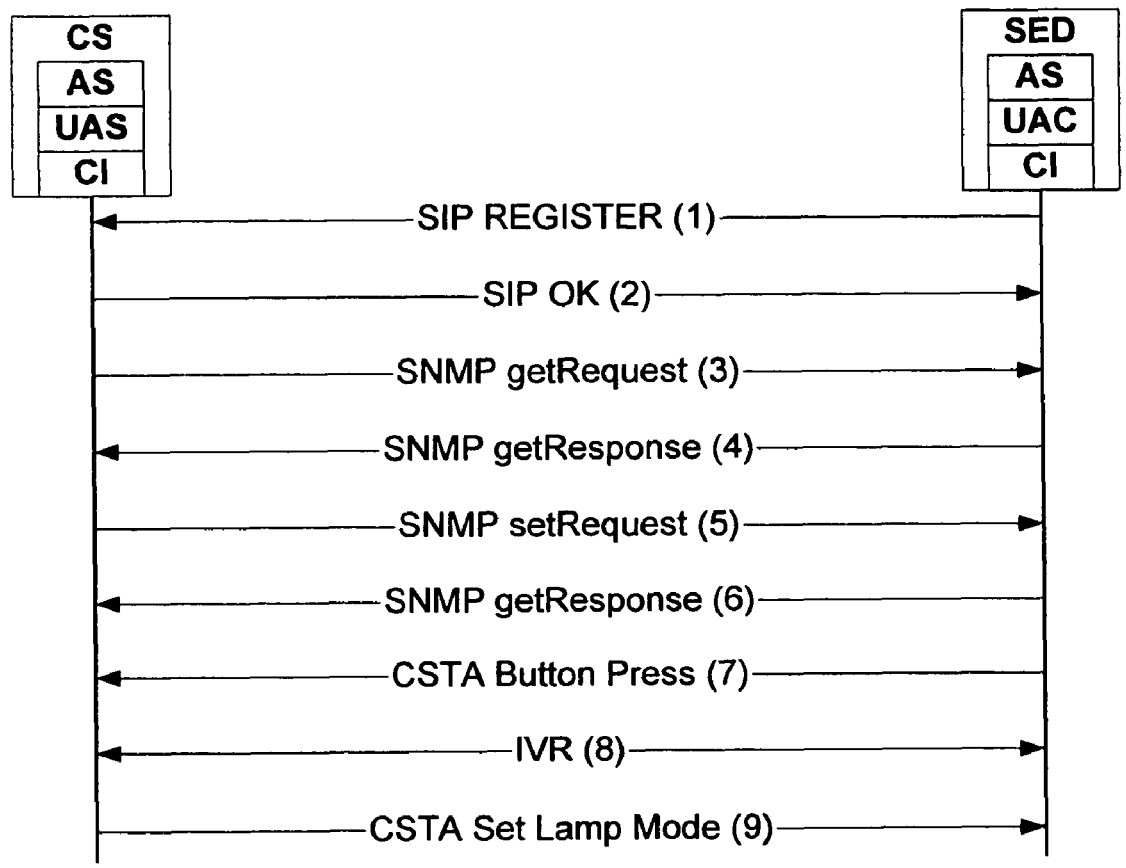
FIG. 6 depicts an exemplary message exchange that is used to control features of a SIP Enabled Device according to a fourth embodiment of the present invention.

Referring now to FIG. 6, an exemplary message exchange between a SIP Enabled Device SED and Central Server CS according to a fourth embodiment of the present invention is depicted. The fourth embodiment employs standard SIP messaging, SNMP messaging, CSTA messaging, and IVR messaging. The SIP Enabled Device SED is comprised of a SIP User Agent Client UAC that communicates with Application Software AS executing on a microprocessor (not shown) of the SIP Enabled Device SED. The SIP User Agent Client UAC of the SIP Enabled Device SED sends SIP request messages and receives SIP response messages through Communications Interface CI.

The Central Server CS is comprised of a SIP User Agent Server UAS that communicates with Application Software AS executing on a microprocessor (not shown) of the Central Server CS. The Application Software AS of the Central Server CS facilitates SIP based communications and provides advanced feature functionality for the SIP Enabled Device SED. The SIP User Agent Server UAS of the Central Server CS receives SIP request messages and sends SIP response messages using a Communications Interface CI.

When the SIP Enabled Device SED is initialized, a SIP REGISTER (1) message is sent from the SIP User Agent Client UAC of the SIP Enabled Device SED to the SIP User Agent Server UAS of the Central Server CS. The SIP REGISTER (1) message contains typical SIP registration information in various header fields of the message.

The SIP User Agent Server UAS of the Central Server CS confirms receipt of the SIP REGISTER (1) message by sending a SIP OK (2) message. The Application Software AS of the SIP Enabled Device SED includes software routines that implement an SNMP manager (not shown). The Application Software AS of the Central Server CS implements a call forward feature. The Application Software AS of the Central Server CS processes the MIB and locates the featureStateCallForward object and attempts to determine if this feature is currently enabled on the SIP Enabled Device SED. To accomplish this, the SNMP manager (not shown) of the Central Server CS generates and sends an SNMP getRequest (3) message, which contains the OID associated with the featureStateCallForward object, to the SNMP agent (not shown) of the SIP Enabled Device SED.

The SNMP agent (not shown) of the SIP Enabled Device SED responds by determining a current value for the featureStateCallForward object, which in this case is "1." The SNMP agent (not shown) of the SIP Enabled Device SED puts the current value in an SNMP getResponse (4) message and sends it to the SNMP manager (not shown) of the Central Server CS. The SNMP manager (not shown) of the Central Server CS processes the SNMP getResponse (4) message and passes the current value of the featureStateCallForward object to the Application Software AS of the Central Server. The Application Software AS of the Central Server determines that the Call Forward feature that is offered by the SIP Enabled Device SED is enabled, because the value of the featureStateCallForward object is "1."

The Application Software AS of the Central Server CS also determines that the feature associated with the featureStateCallForward object is incompatible with a call forward feature that is implemented by the Application Software AS of the Central Server CS. The SNMP manager (not shown) of the Central Server CS constructs an SNMP setRequest (5) message, which includes the OID for the featureStateCallForward object and a data value of "0." The SNMP setRequest (5) message is sent to the SNMP agent (not shown) of the SIP Enabled Device SED. The SNMP agent (not shown) of the SIP Enabled Device SED updates the value the featureStateCallForward object and returns a SNMP getResponse (6) message to the SNMP manager (not shown) of the Central Server CS. The Application Software AS of the SIP Enabled Device SED monitors the value of the featureStateCallForward object. When the value of the featureStateCallForward object is changed to "0" the Application Software AS of the SIP Enabled Device SED disables the Call Forward feature.

The Application Software AS of the Central Server CS is informed, e.g., with notification information in the form of an XML file, when a user (not shown) of the SIP Enabled Device SED attempts to activate the disabled Call Forward Feature by pressing the Feature Button FB. A user (not shown) of the SIP Enabled Device SED receives an incoming call that she wishes to forward to another SIP enabled device (not shown). When the user (not shown) of the SIP Enabled Device SED presses the Function Button FB of the User Interface UI, the Application Software AS of the SIP Enabled Device SED invokes a CSTA software routine (not shown) that causes a CSTA Button Press (7) message to be sent to the Central Server CS.

The Application Software AS of the Central Server CS has a CSTA software routine (not shown) that processes the CSTA Button Press (7) message. When the Application Software AS determines that the Feature Button FB has been pressed, an IVR software routine, which works in conjunction with the software routine that implements the call forward feature is invoked. The IVR software routine generates an in-band audible prompt that requests the user (not shown) to enter a call forward destination.

The user (not shown) of the SIP Enabled Device SED uses the Keypad KP to enter a call forward destination and corresponding DTMF signals are encoded and sent as data to the Central Server CS. The data traffic that results from the IVR software routine and the use of the Keypad KP is depicted as IVR (8) in FIG. 6. The IVR software routine decodes the DTMF data and passes the call forward destination to the Application Software AS of the Central Server CS, which causes the call to the SIP Enabled Device SED to be forwarded to the call forward destination. The CSTA software routine (not shown) of the Application Software AS of the Central Server CS instructs the SIP User Agent Server to create a CSTA Set Lamp Mode (9) service request message, which is sent to the SIP Enabled Device SED. The CSTA software routine (not shown) of the SIP Enabled Device SED processes the CSTA Set Lamp Mode (9) message and the Application Software AS of the SIP Enabled Device SED causes the Light Emitting Diode LED of the Function Button FB to flutter, for example.

The present invention has been illustrated and described with reference to particular embodiments and applications thereof. It will be readily apparent to those skilled in that art that the present invention will have applications beyond those described herein for purposes of description of the invention. For example, the present invention can be adapted for use in any environment where SIP based features are offered by SIP enabled devices and central servers.

To facilitate discussion of the present invention, preferred embodiments are assumed; however, the above-described embodiments are merely illustrative of the principals of the invention and are not intended to be exclusive embodiments thereof. It should be understood by one skilled in the art that alternative embodiments drawn to variations in the enumerated embodiments and teachings disclosed herein can be derived and implemented to realize the various benefits of the present invention.

It should further be understood that the foregoing and many various modifications, omissions and additions may be devised by one skilled in the art without departing from the spirit and scope of the invention. It is therefore intended that the present invention is not limited to the disclosed embodiments but should be defined in accordance with the claims which follow.

We claim:

1. A method of remote feature control in a network of devices employing the Session Initiation Protocol (SIP) comprising:

providing a central server including one or more SIP features;

providing one or more local SIP enabled devices with a configurable feature, said local SIP enabled devices in communication with said central server, wherein in at least one of said local SIP enabled devices said configurable feature is incompatible with said one or more SIP features on said central server, said central server identifying a corresponding SIP feature; and remotely controlling said configurable feature of said local SIP enabled device with said central server, said central server mapping incompatible configurable features of said one or more local SIP enabled devices to corresponding ones of said one or more SIP features, wherein said central server controls said configurable feature by:

receiving feature information regarding said configurable feature, wherein said feature information is sent from said SIP enabled device in a SIP message to said central server and includes a feature mapping and a feature button mapping for a respective said configurable feature, sending feature configuration information from said central server to said SIP enabled device, determining for each of said local SIP enabled devices whether said configurable feature is compatible with said one or more SIP features, and responsive to an incompatibility determination disabling said configurable feature in said SIP enabled device, receiving notification information that indicates said configurable feature has been activated, wherein said notification information is sent from said SIP enabled device to said central server, and performing a functionality of said configurable feature on behalf of said SIP enabled device after receiving said notification information; and wherein said corresponding SIP features perform an equivalent function to mapped said incompatible configurable features.

2. The method according to claim 1, wherein said feature information includes an object defined in a Simple Network Management Protocol (SNMP) Management Information Base (MIB).

3. The method according to claim 1, wherein said central server is a server in a Central Office (CO) and said feature configuration information is sent in a SIP message.

4. The method according to claim 1, wherein said feature configuration information is sent in an SNMP setRequest message.

5. The method according to claim 1, wherein said notification information is sent in a SIP message and said central server remotely configures SIP enabled device features to ensure interoperability with said one or more SIP features.

6. The method according to claim 5, wherein said notification information is in the form of an XML file.

7. The method according to claim 1, wherein said notification information is sent in a Computer Supported Telecommunications Applications (CSTA) message.

8. The method according to claim 7, wherein said notification information includes status and processing information.

9. The method according to claim 7, wherein said notification information includes configuration data.

10. The method according to claim 1, further comprising:
sending resource control information that controls a state of a resource of said SIP enabled device, wherein said resource control information is sent from said central server to said SIP enabled device.

11. The method according to claim 10, wherein said resource control information is sent in a SIP message.

12. The method according to claim 10, wherein said resource control information is sent in a CSTA message.

13. A network of devices employing the Session Initiation Protocol (SIP) comprising:
a central server with one or more SIP features, wherein said central server is a server in a Central Office (CO);
a local SIP enabled device with a configurable feature, in communication with said central server and providing feature information about said configurable feature to said central server, said central server determining whether said configurable feature is compatible with said one or more SIP features;
wherein said central server remotely controls compatible and incompatible configurable features of said local SIP enabled device responsive to the compatibility determination, wherein said central server maps incompatible configurable features to corresponding ones of said one or more SIP features, wherein said feature information includes a feature mapping and a feature button mapping for a respective said configurable feature, said central server identifying a corresponding SIP feature and mapping said incompatible configurable feature to said corresponding SIP feature, wherein said central server controls said configurable feature by:
receiving said feature information regarding said configurable feature, wherein said feature information is sent from said SIP enabled device to said central server,
sending said feature configuration information from said central server in a SIP message to said SIP enabled device,
disabling said configurable feature in said SIP enabled device responsive to an incompatibility determination,
receiving notification information that indicates said configurable feature has been activated, wherein said notification information is sent from said SIP enabled device to said central server, and
performing a functionality of the configurable feature on behalf of said SIP enabled device after receiving said notification information, wherein said central server remotely configures SIP enabled device features to ensure interoperability with said one or more SIP features; and
wherein corresponding mapped said SIP features each perform an equivalent function to respective said incompatible configurable feature.

14. The network of claim 13, wherein said feature information includes an object defined in a Simple Network Management Protocol (SNMP) Management Information Base (MIB).

15. The network of claim 13, wherein said feature information is sent in a SIP message.

16. The network of claim 14, wherein said feature configuration information is sent in an SNMP setRequest message.

17. The network of claim 13, wherein said notification information is sent in a SIP message.

18. The network of claim 13, wherein said notification information is sent in a Computer Supported Telecommunications Applications (CSTA) message.

19. The network of claim 13, further comprising:
sending resource control information that controls a state of a resource of said SIP enabled device, wherein said resource control information is sent from said central server to said SIP enabled device.

20. The network of claim 19, wherein said resource control information is sent in a SIP message.

21. The network of claim 19, wherein said resource control information is sent in a CSTA message.

* * * * *